United States Patent
Kim et al.

(10) Patent No.: US 9,456,349 B2
(45) Date of Patent: Sep. 27, 2016

(54) ELECTRONIC DEVICE AND NETWORK TEMPORARY UNLOCKING METHOD THEREOF

(71) Applicant: Samsung Electronics Co., Ltd, Gyeonggi-do (KR)

(72) Inventors: Min-Ju Kim, Gyeonggi-do (KR); Jin-Woo Jang, Gyeonggi-do (KR)

(*) Notice: Subject to any disclaimer, the term of this patent is extended or adjusted under 35 U.S.C. 154(b) by 0 days.

(21) Appl. No.: 14/717,843

(22) Filed: May 20, 2015

(65) Prior Publication Data

US 2016/0037344 A1 Feb. 4, 2016

(30) Foreign Application Priority Data

Jul. 29, 2014 (KR) ............ 10-2014-0096830

(51) Int. Cl.
*H04M 1/66* (2006.01)
*H04W 12/08* (2009.01)
*H04L 29/08* (2006.01)
*H04L 29/06* (2006.01)

(52) U.S. Cl.
CPC ............. *H04W 12/08* (2013.01); *H04L 67/14* (2013.01); *H04L 69/28* (2013.01)

(58) Field of Classification Search
CPC ....... H04W 12/08; H04L 69/28; H04L 67/14
USPC .......... 455/411, 414.1, 558, 435.2, 410, 574, 455/408
See application file for complete search history.

(56) References Cited

U.S. PATENT DOCUMENTS

| | | | |
|---|---|---|---|
| 7,389,123 B2 | 6/2008 | Rydgren et al. | |
| 7,840,234 B2 | 11/2010 | Chan | |
| 8,369,823 B2* | 2/2013 | Chen | H04L 63/102 455/404.1 |
| 8,467,531 B2 | 6/2013 | Sun et al. | |
| 2005/0266886 A1 | 12/2005 | Chan | |
| 2006/0276172 A1 | 12/2006 | Rydgren et al. | |
| 2012/0057701 A1 | 3/2012 | Sun et al. | |
| 2012/0058743 A1 | 3/2012 | Chen | |
| 2013/0210389 A1* | 8/2013 | Obaidi | H04W 12/08 455/411 |
| 2014/0226648 A1* | 8/2014 | Xing | H04W 56/001 370/350 |
| 2015/0103633 A1* | 4/2015 | Henderson | G06F 1/14 368/10 |

* cited by examiner

*Primary Examiner* — Dhaval Patel (57) ABSTRACT

An electronic device is provided. The electronic device includes a communication interface configured to transmit a network temporary unlock request and receive a network temporary unlock approval. The electronic device also includes a processor configured to perform a network temporary unlock when the approval of the network temporary unlock is received, and release the network temporary unlock when a network temporary unlock time has expired by determining whether the network temporary unlock expiration time has come.

20 Claims, 7 Drawing Sheets

ELECTRONIC DEVICE AND NETWORK TEMPORARY UNLOCKING METHOD THEREOF

CROSS-REFERENCE TO RELATED APPLICATION AND CLAIM OF PRIORITY

The present application is related to and claims benefit under 35 U.S.C. §119(a) to Korean Application Serial No. 10-2014-0096830, which was filed in the Korean Intellectual Property Office on Jul. 29, 2014, the entire content of which is hereby incorporated by reference.

TECHNICAL FIELD

The present disclosure relates to an electronic device and, more particularly to, a method for temporarily unlocking a network in an electronic device.

BACKGROUND

Recently, thanks to a remarkable development of information and communication technology and semiconductor technology, the prevalence and use of various electronic devices is rapidly increasing. Especially, recent electronic devices have been developed to be able to communicate while being carried on the body. A user receives a communication service by subscribing to the network which the user wants among various networks in order to communicate using the electronic device. Typically, the electronic device is mostly equipped with a network lock function at the time of release. Also referred to as a factory lock, a network lock is a function which may limit the use from the rest of networks except a particular network among networks.

SUMMARY

When an electronic device is equipped with a network lock function, a communication service can be received only through a specific network provider. For example, when a network lock is established for the electronic device to use a network of provider A only, then a user cannot use a network of provider B via the electronic device. Therefore, in order for another network other than a specific network to be used, the state of the electronic device should be switched from the network locking state to the network unlocking state. The electronic device may use another network other than a specific network under the state of network unlock.

However, the conventional network unlock provides only a permanent unlock function in which the state of network unlock, once becomes the state of network unlock, is maintained permanently until the state is switched to network lock. Therefore, there is a problem that the electronic device cannot temporarily use another network other than a specific network.

It is a primary object to provide an electronic device capable of temporarily using another network other than a specific network and a temporary unlocking method in the electronic device. Further, various embodiments of the present disclosure are to provide an electronic device capable of preventing a forgery or alteration through the user input in a network temporary unlock which temporarily allows the use of another network other than a specific network, and a temporary unlocking method in the electronic device. At least one of the aforementioned aspects of the present disclosure can be achieved by configurations described herein.

In a first example, an electronic device includes a communication interface configured to transmit a network temporary unlock request and receive a network temporary unlock approval. The electronic device also includes a processor configured to perform a network temporary unlock when the approval of the network temporary unlock is received, and release the network temporary unlock when a network temporary unlock time has expired by determining whether the network temporary unlock expiration time has come.

In a second example, a method for unlocking a network in an electronic device is provided. The method includes transmitting a network temporary unlock request and receiving a network temporary unlock approval. The method also includes performing a network temporary unlock when the network temporary unlock approval is received. The method further includes determining whether a network temporary unlock expiration time has come. The method includes releasing the network temporary unlock when the network temporary unlock time has expired.

In a third example, a storage medium storing a network temporary unlock program, that when executed by one or more processors of an electronic device, cause the one or more processors to: transmit a network temporary unlock request and receiving a network temporary unlock approval, perform a network temporary unlock when the network temporary unlock approval is received, determine whether a network temporary unlock expiration time has come, and release the network temporary unlock when the network temporary unlock time has expired. According to various embodiments of the present disclosure, it is possible for another network other than a specific network to be used temporarily for a predetermined period by providing a temporary unlock function in an electronic device having a network lock function which allows only a specific network to be used.

Moreover, various embodiments of the present disclosure are capable of preventing a forgery or alterations through the user input during a temporary unlock which allows the temporary use of another network other than a specific network in the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device and communication system. Hereinafter, various embodiments of the present disclosure will be described with reference to the accompanying drawings. The present disclosure may be modified in various forms and include various embodiments, but specific examples are illustrated in the drawings and described in the description. However, the description is not intended to limit the present disclosure to the specific embodiments, and it shall be appreciated that all the changes, equivalents and substitutions belonging to the idea and technical scope of the present disclosure are included in the present disclosure. In the description of the drawings, identical or similar reference numerals are used to designate identical or similar elements.

Hereinafter, the terms "include" or "include", which is used in various embodiments of the present disclosure, refer to the presence of disclosed functions, operations or elements, and do not restrict the addition of one or more functions, operations or elements. In the present disclosure, the terms such as "include" or "have" is construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" includes A, includes B, or includes both A and B. "The first" or "the second" used in various embodiments of the present disclosure modify various elements of embodiments, and may not restrict the corresponding elements. For example, the above expressions do not limit the sequence and/or importance of the elements. The above expressions are used merely for the purpose of distinguishing an element from the other elements. For example, both a first electronic device and a second electronic device are electronic devices, and the first and second electronic devices refers to electronic devices of different users or different devices of the same user. For example, both a first electronic device and a second electronic device are electronic devices, and the first and second electronic devices refers to electronic devices of different users or different devices of the same user. For example, without departing from the scope of the present disclosure, a first component element is named a second component element. Similarly, the second component element also is named the first component element.

It should be noted that if it is described that one component element is "coupled" or "connected" to another component element, the first component element is directly coupled or connected to the second component, and a third component element is "coupled" or "connected" between the first and second component elements. Conversely, when one component element is "directly coupled" or "directly connected" to another component element, it is construed that a third component element does not exist between the first component element and the second component element.

The terms in various embodiments of the present disclosure are used to describe a specific embodiment, and are not intended to limit the present disclosure. As used herein, the singular forms are intended to include the plural forms as well, unless the context clearly indicates otherwise. Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure is a device with a communication function. For example, the electronic device includes at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (such as, a head-mounted-device (HMD) such as electronic glasses, electronic clothes, an electronic bracelet, an electronic necklace, an electronic appcessory, an electronic tattoo, or a smart watch).

According to some embodiments, the electronic device is a smart home appliance with a communication function. The smart home appliance as an example of the electronic device include at least one of a television, a Digital Video Disk (DVD) player, an audio, a refrigerator, an air conditioner, a vacuum cleaner, an oven, a microwave oven, a washing machine, an air cleaner, a set-top box, a TV box (such as, SAMSUNG HOMESYNC™, APPLE TV™, or GOOGLE TV™), a game console, an electronic dictionary, an electronic key, a camcorder, and an electronic picture frame.

According to some embodiments, the electronic device includes at least one of various medical devices (such as, a magnetic resonance angiography (MRA), a magnetic resonance imaging (MRI), a computed tomography (CT) machine, and an ultrasonic machine), navigation devices, global positioning system (GPS) receivers, event data recorders (EDR), flight data recorders (FDR), vehicle infotainment devices, electronic devices for ships (such as, navigation devices for ships, and gyro-compasses), avionics, security devices, automotive head units, robots for home or industry, automatic teller's machines (ATMs) in banks, or point of sales (POS) in shops.

According to some embodiments, the electronic device includes at least one of furniture or a part of a building/structure, an electronic board, an electronic signature receiving device, a projector, and various types of measuring devices (for example, a water meter, an electric meter, a gas meter, a radio wave meter and the like) including a camera function. An electronic device according to various embodiments of the present disclosure is a combination of one or more of above described various devices. Also, an electronic device according to various embodiments of the present disclosure is a flexible device. Also, an electronic device according to various embodiments of the present disclosure is not limited to the above described devices.

Hereinafter, an electronic device according to various embodiments of the present disclosure will be described with reference to the accompanying drawings. The term "user" used in various embodiments refer to a person who uses an electronic device or a device (for example, an artificial intelligence electronic device) that uses an electronic device.

Figure 1:
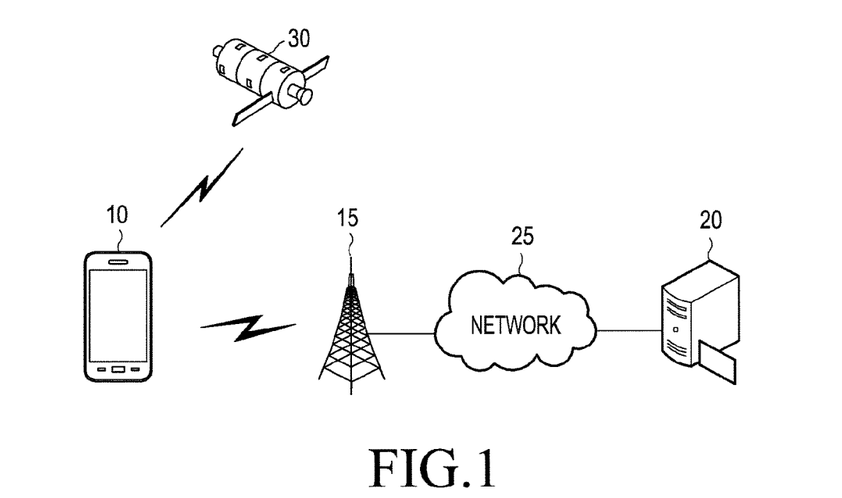
FIG. 1 is a diagram illustrating an example communication system for a temporary unlock of an electronic device according to this disclosure.
Figure 2:
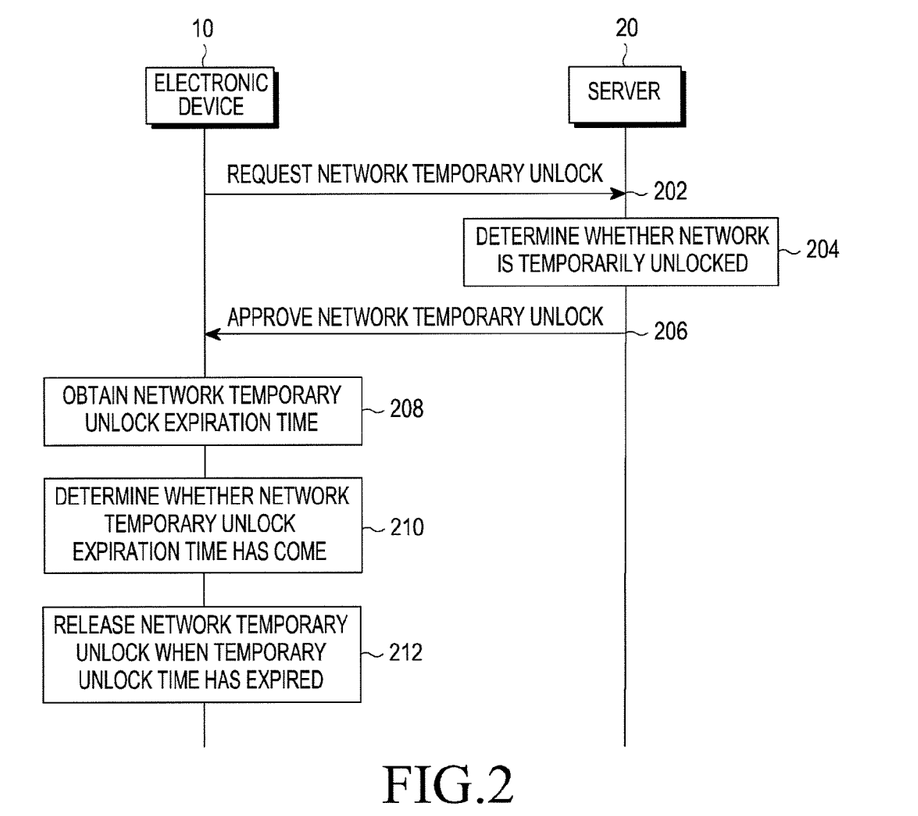
FIG. 2 is a diagram illustrating an example procedure for a temporary unlock of the electronic device according to this disclosure.

FIG. 1 is a diagram illustrating an example communication system for temporarily unlocking an electronic device according to this disclosure. FIG. 2 is a diagram illustrating an example procedure for temporary unlocking the electronic device according to this disclosure. Referring to FIGS. 1 and 2, the electronic device 10, in a state of network lock, requests a temporary unlock to the server 20 via a communication network 25 by using a base station 15 in operation 202. The server 20, in operation 204, determines whether a temporary unlock is approved according to the temporary unlock request from the electronic device 10. The server 20 transmits a temporary unlock approval message to the electronic device 10 in operation 206 when the temporary unlock is determined to be approved. The electronic device 10 performs a temporary unlock in operation 208 if the temporary unlock is approved from the server 20. The electronic device 10 determines whether the temporary unlock expiration time has come by using the time information obtained through an external signal or by using an internal timer in operation 210. According to an embodiment, the electronic device 10 determines whether a temporary unlock expiration time has come by acquiring the time information through the reception of an external signal. For example, the electronic device 10 obtains time information by receiving a Network Identity and Time Zone signal (NITZ) from the base station 15. According to an embodiment, the NITZ signal includes a network ID, a time zone, local time and date information, and is provided via a base station 15 by a mobile communication company. According to an embodiment, the mobile communication company is as follows in Table 1 as a service provider from all over the world.

TABLE 1

Avea (Turkey)
Vodafone Australia (Australia)
China Mobile (China)
China Unicom (China)
E-Plus (Germany)
SoftBank (Japan)
Movistar (Mxico)
T-Mobile (Netherlands)
Vodafone NZ (New Zealand)
Tele2 (Sweden)
3 (Sweden)
EE (telecommunications company) (United Kingdom)

Meanwhile, the electronic device 10 receives GPS signals from at least three satellites or GPS 30, and reflects a margin of error occurring in each of the received signals, and then obtains time information by correcting a time error and location error based on three or more values for location information.

The electronic device 10 determines whether a temporary unlock expiration time has come by using the obtained time information. Further, according to an embodiment, the electronic device 10, when the external time information is not received, performs a timer discount by creating a timer which discounts time remaining up to the obtained temporary unlock expiration time and determines whether the temporary unlock expiration time has come by using the timer. The electronic device 10, in operation 212, releases the network temporary unlock as the temporary unlock expiration time has come. According to an embodiment, the electronic device 10 releases the temporary unlock and then return to the state of network lock.

Figure 3:
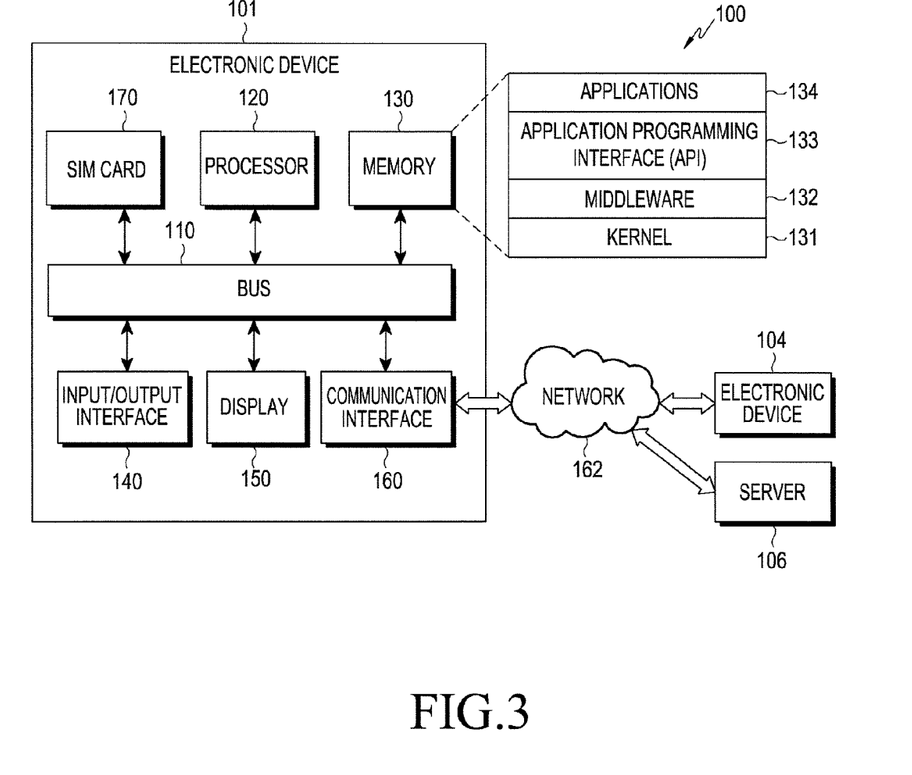
FIG. 3 is a block diagram illustrating an example network environment including an electronic device according to this disclosure.

FIG. 3 is a block diagram illustrating an example network environment including an electronic device according to this disclosure. Referring to FIG. 3, the electronic device 101 includes a bus 110, a processor 120, a memory 130, an input/output interface 140, a display 150, and a communication interface 160 and SIM card 170. The bus 110 is a circuit for connecting the aforementioned components and transmitting communication (for example, a control message) between the aforementioned components.

The processor 120, for example, receives instructions from other components (for example, the memory 130, the input/output interface 140, the display 150, and the communication interface 160) through the bus 110, analyzes the received instructions, and executes calculations or data processing according to the analyzed instructions. According to an embodiment, the processor 120 executes calculations or data processing required for a state of temporary unlock.

The memory 130 stores instructions or data received from or created by the processor 120 or other elements (such as, the input/output interface 140, the display 150, and the communication interface 160). The memory 130 includes programming modules 100, for example, a kernel 131, middleware 132, an Application Programming Interface (API) 133, and applications 134. Each of the aforementioned programming modules is formed of software, firmware, hardware, or a combination of at least two thereof.

The kernel 131 controls or manages system resources (such as, the bus 110, the processor 120, or the memory 130) used for executing an operation or a function implemented in the remaining other programming modules, for example, the middleware 132, the API 133, or the application 134. In addition, the kernel 131 provides an interface through which the middleware 132, the API 133, or the applications 134 controls or manages the individual components of the electronic device 101 while accessing the individual components.

The middleware 132 serves as an intermediary who allows the API 133 or the applications 134 to communicate with the kernel 131, so as to exchange data. Furthermore, in regard to task requests received from the applications 134, the middleware 132 performs a control (such as, scheduling or load balancing) for the task requests, using a method of allocating at least one application of the applications 134 a priority for using the system resources (such as, the bus 110, the processor 120, and the memory 130) of the electronic device 101.

The API 133 is an interface through which the applications 134 controls functions provided by the kernel 131 and the middleware 132, and includes at least one interface or function (such as, an instruction) for file control, window control, image processing, or text control. According to various embodiments, the application 134 includes an SMS/MMS application, an email application, a calendar application, an alarm application, a health care application, a network unlock application for performing a temporary unlocking of the network lock or an environment information application (such as an application that provides atmospheric pressure, humidity or temperature information, or the like), and the like. Additionally or alternately, the applications 134 include an application related to an information exchange between the electronic device 101 and an external electronic device (such as, an electronic device 104). The application related to the exchange of information includes, for example, a notification relay application for transferring predetermined information to the external electronic device or a device management application for managing the external electronic device.

For example, the notification relay application includes a function of transferring, to the external electronic device (such as, the electronic device 104), notification information generated in other applications of the electronic device 101 (such as, a network unlock application, a health care application, an SMS/MMS application, an e-mail application, and an environment information application). Additionally or alternatively, the notification relay application receives the notification information from, for example, the external electronic device (such as, the electronic device 104), and provides the received notification information to a user. For example, the device management application manages (such as, install, delete, or update) functions for at least a part of the external electronic device (such as, the electronic device 104) communicating with the electronic device 101 (such as, turning on/off the external electronic device itself (or some elements thereof) or adjusting the brightness (or resolution) of a display), applications operating in the external electronic device, or services (such as, a telephone call service or a message service) provided from the external electronic device.

According to various embodiments, the applications 134 include an application set on the basis of an attribute (for example, a type of the electronic device) of the external electronic device (for example, the electronic device 104). For example, when the external electronic device is an MP3 player, the applications 134 include an application related to the reproduction of music. Similarly, when the external electronic device is a mobile medical appliance, the applications 134 include an application related to health care. Similarly, when the external electronic device is an electronic device capable of a temporary unlock, the application 134 includes an application related to the temporary unlock.

According to an embodiment, the applications 134 includes at least one of an application designated to the electronic device 101 and an application received from the external electronic device (for example, a server 106 or the electronic device 104).

The input/output interface 140 transfers instructions or data input from a user through an input/output device (such as, a sensor, a keyboard, or a touch screen) to the processor 120, the memory 130, and the communication interface 160 through, for example, the bus 110. For example, the input/output interface 140 provides the processor 120 with data for a user's touch input through the touch screen. In addition, the input/output interface 140 may, through the input/output device (such as, a speaker or a display), output instructions or data received from the processor 120, the memory 130, or the communication interface 160 through, for example, the bus 110. For example, the input/output interface 140 outputs voice data, which is processed through the processor 120, to a user through a speaker. The display 150 displays various pieces of information (for example, multimedia data or text data) for the user.

The communication interface 160 connects communication between the electronic device 101 and the external device (such as, the electronic device 104 or the server 106). For example, the communication interface 160 is connected to a network 162 through wireless or wired communication to communicate with the external device. The wireless communication includes at least one of, for example, Wi-Fi, BLUETOOTH® (BT), Near Field Communication (NFC), a Global Positioning System (GPS), and cellular communication (for example, Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)). The wired communication includes at least one of, for example, a Universal Serial Bus (USB), a High Definition Multimedia Interface (HDMI), Recommended Standard 232 (RS-232), and a Plain Old Telephone Service (POTS).

According to an embodiment, the network 162 is a telecommunication network. The communication network includes at least one of a computer network, the Internet, the Internet of things, or a telephone network. According to one embodiment, a protocol (such as, a transport layer protocol, data link layer protocol, or a physical layer protocol) for communication between the electronic device 101 and the external device is supported by at least one of the application 134, the application programming interface 133, the middleware 132, the kernel 131, and the communication interface 160.

According to an embodiment, the server 106 supports the driving of the electronic device 101 by performing at least one operation (or function) implemented in the electronic device 101. For example, the server 106 supports a temporary unlock implemented on the electronic device 101. The Subscriber Identification Module (SIM) card 170 is also detachably attached to the electronic device 101 in a plug-in type and also is embedded in a built-in type. Such a SIM card 170 stores SIM information. The SIM information includes information for activating the electronic device and subscriber information such as a user password as well as information for a network registration. According to an embodiment, the SIM card 170 is also a User Identity Module (UIM) and a Universal Subscriber Identity Module (USIM).

Figure 4:
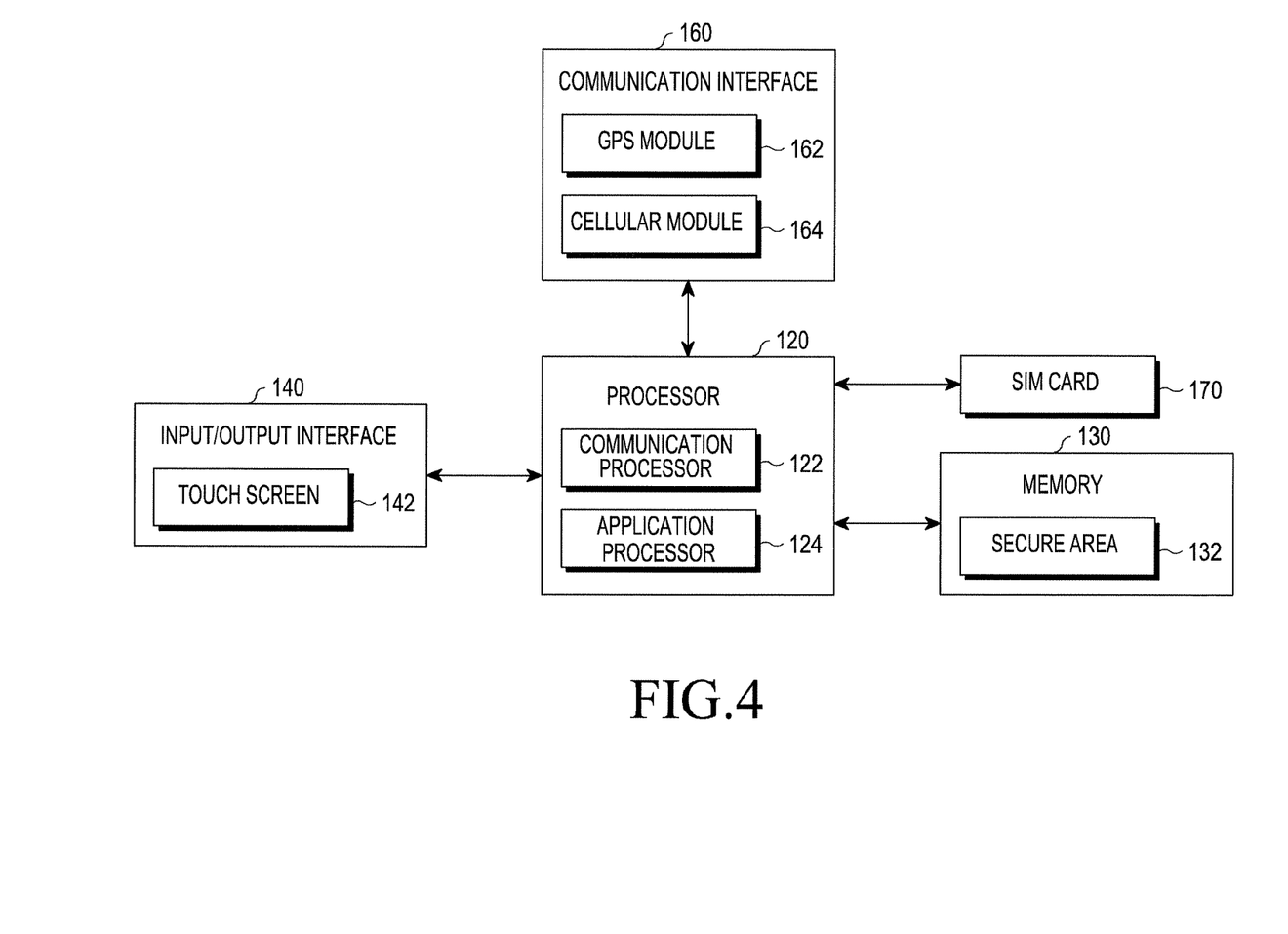
FIG. 4 is a diagram illustrating an example configuration for a temporary unlock of an electronic device according to this disclosure.

FIG. 4 is a diagram illustrating an example configuration for a network temporary unlock of the electronic device according to this disclosure. Referring to FIG. 4, an input/output interface 140 includes a touch screen 142. A touch screen 142 transfers instructions or data which is input by the user for requesting a network temporary unlock to the processor 120, the memory 130 or the communication interface 160. The communication interface 160 communicates with the external server 106, transmits a network temporary unlock request to the external server 106, and receives the network temporary unlock request from the external server 106. Further, the communication interface 160 receives an external signal. According to an embodiment, the communication interface 160 includes a GPS module 162 and a cellular module 164, receives GPS signals from at least three satellites or GPS 30 through the GPS module 162, and receives a NITZ signal from the base station 15 through the cellular module 164.

A processor 120 includes a communication processor 122 and an application processor 124. The communications processor 122 controls the communication interface 160, and the application processor 124 controls the execution of the application. The communication processor 122 and the application processor 124 is also implemented by being integrated into a single processor 120. One of either the communication processor 122 or the application processor 124, or the integrated processor 120 performs a temporary unlock operation according to the embodiment. In the following exemplary embodiment, an example of executing the temporary unlock operation by the integrated processor 120 will be described.

The processor 120 is controlled to require a temporary unlock to the server 106 through the communication interface 160 according to a temporarily unlock request which is input by the user. In addition, the processor 120 may, if the temporary unlock approval is received from the server 106, establish the locked state of the electronic device 101 to the temporary unlocked state. The processor 120 is controlled to use the SIM card for only a predetermined period by the temporary unlock regardless of whether the SIM card 170 is a specific network that is permitted in advance by the network lock when the SIM card 170 is connected to the processor 120 in a state of temporary network unlock.

The processor 120 determines, in the state of network lock, whether the temporary unlock expiration time has come by utilizing the time information obtained using an external signal or by utilizing an internal timer. According to an embodiment, the processor 120, when an external signal is received, obtains time information by utilizing the received external signal and determines whether the unlock expiration time has come by utilizing the obtained time information. For example, the processor 120 obtains time information by utilizing a Network Identity and Time Zone (NITZ) signal received from the base station 15, and determines whether the unlock expiration time has come by utilizing the obtained time information. According to another example, the processor 120 reflects a margin of error occurring in each of the received signals by utilizing GPS signals received from at least three satellites or GPS 30, and then based on the values for three or more location information, obtains time information by correcting a time error and position error, and determines whether the temporary unlock expiration time has come by utilizing the obtained expiration time.

According to an embodiment, the processor 120, when an external signal is not received, creates a timer to discount time remaining up to the temporary unlock expiration time, and performs a timer discount, to determine whether the temporary unlock expiration time has come. According to an embodiment, the time remaining up to the temporary unlock expiration time is calculated based on the time information upon receiving the first temporary unlock approval, or is calculated based on the time information by the external signal received last after receiving the temporary unlock.

The processor 120, as the temporary unlock time has expired, releases the temporary unlock and return to the network locked state. The processor 120, if the network locked state has been returned, determines whether the SIM card 170 is a SIM card which uses a particular network permitted in advance by the network lock, and control to use the SIM card which uses the particular network permitted in advance.

A memory 130 includes a secure area 132. The secure area 132 is a security area being accessed allowed only by the processor 120. The time value that is discounted by a timer is stored in the secure area 132 of the memory 130. As the time value discounted by a timer is stored in the secure area 132, the temporary unlock period is not forged or altered by the user, and the security is maintained.

Figure 5:
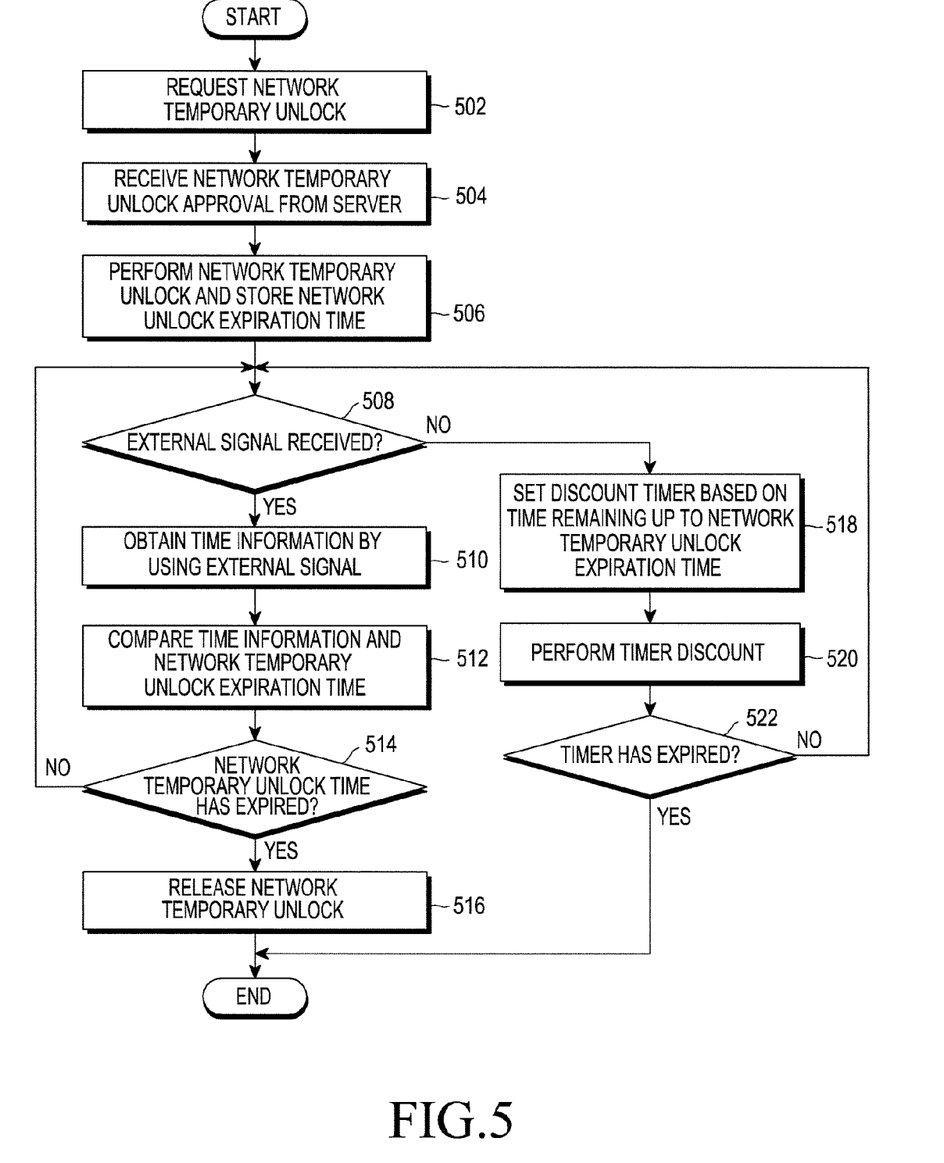
FIG. 5 is a diagram illustrating an example operation of performing a temporary unlock in an electronic device according to this disclosure.

FIG. 5 is a diagram illustrating an example operation of performing a temporary unlock in an electronic device according to this disclosure. Referring to FIG. 5, the electronic device 101, in operation 502, requests a network temporary unlock. According to an embodiment, the electronic device 101 requests the network temporary unlock to the server 106 through the communication interface 160 according to the network temporary unlock request input by the user. The electronic device 101, in operation 504, receives a network temporary unlock approval. The electronic device 101, if the temporary unlock approval from the server 106 is received, in operation 506, performs the network temporary unlock, and store the network unlock expiration time.

According to an embodiment, the electronic device 101, when the SIM card 170 is connected to the processor 120 in a state of the network temporary unlock, is allowed to be able to use the SIM card up to the temporary unlock expiration time regardless of whether the SIM card 170 is a specific network that is permitted in advance by the network lock. According to an embodiment, the network unlock expiration time is stored in the secure area 132 of the memory 130. As the network unlocks expiration time is stored in the secure area 132 of the memory 130, a forgery or alteration by the user is prevented.

The electronic device 101, in operation 508, determines whether the external signal capable of acquiring time information is received. According to an embodiment, the external signal capable of acquiring time information is a Network Identity and Time Zone (NITZ) signal from the base station 15, or GPS signals from three or more satellites or GPS 30. According to an embodiment, the electronic device 101 determines whether a Network Identity and Time Zone (NITZ) signal from the base station 15, or GPS signals from three or more satellites or GPS 30 are received.

The electronic device 101, in operation 510, obtains time information using the external signal. According to an embodiment, the electronic device 101 obtains the time information by using the NITZ signal received from the base station 15. According to an embodiment, the electronic device 101 reflects a margin of error occurring in each of the received signals by using GPS signals received from at least three satellites or GPS 30, and then obtains time information by correcting a time error and position error, based on the values for three or more location information.

The electronic device 101, in operation 512, compares the obtained time information and network temporary unlock expiration time. The electronic device 101, in operation 514, as a result of the comparison, determines whether network temporary unlock expiration time has come. According to an embodiment, the electronic device 101 determines whether the network temporary unlock expiration time has come, when the obtained time information is equal to a network temporary unlock expiration time or the obtained time information is a time that exceeds an expiration time of the network temporary unlock. The electronic device 101, when the temporary unlock expiration time has come, in operation 516, releases the network temporary unlock. According to an embodiment, the electronic device 101 returns to the network lock state when the temporary unlock is released.

The electronic device 101 determines whether the SIM card 170 is a SIM card capable of using a particular network permitted in advance by the network lock, and is allowed to be able to use only in the SIM card capable of using a particular network. Meanwhile, the electronic device 101, when the external signal capable of acquiring time information is not received, in operation 518, sets the discount timer based on the time remaining up to the network temporary unlock expiration time. According to an embodiment, the electronic device 101 sets the discount timer that is discounted at a predetermined time interval (such as 1 second interval) in the time remaining up to the network temporary unlock expiration time. According to an embodiment, the time remaining up to the temporary unlock expiration time is calculated based on the time information upon receiving the first temporary unlock approval or is calculated based on time information of external signal received last after receiving the temporary unlock approval.

The electronic device 101 performs a timer discount in operation 520, and determines whether the timer has expired in operation 522. According to an embodiment, the electronic device 101 determines that the timer has expired when the timer value has become discounted to 0 at a predetermined time interval (such as 1 second interval) in the time remaining up to the network temporary unlock expiration time. According to an embodiment, as the timer value being discount is stored in the secure area 132 of the memory 130, and forgery or alteration by the user is prevented.

The electronic device 101, when the timer expires, then the process proceeds to operation 516, releases the network temporary unlock. According to an embodiment, the electronic device 101 returns to the network locked state, when the temporary unlock is released. The electronic device 101, when network temporary unlock expiration time has not yet come, or a timer has not expired, returns to operation 508. According to the network temporary unlock operation of the electronic device 101 as described above, the electronic device 101 determines the expiration of the network temporary unlock by using an external signal, or determine by using an internal timer. It is convenient that the electronic device 101 determines the temporary unlock expiration time by using the internal timer when the external signal cannot be received because the external signal and the internal timer are utilized together by the electronic device 101.

FIG. 6 is a diagram illustrating an example screen of a temporary unlock request in an electronic device according to this disclosure. Referring to FIG. 6, the electronic device 101, as shown in FIG. 6A, displays one or more applications 600 through the touch screen 162. A network temporary unlock application 601 is included among one or more applications 600.

Figure 6A:
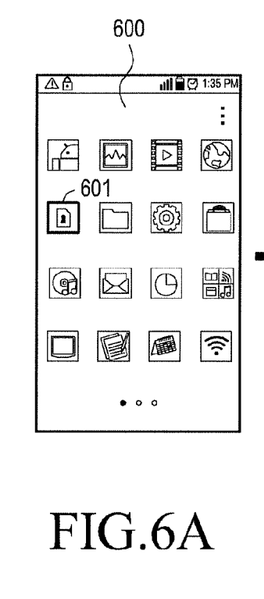
FIGS. 6A, 6B, 6C, 6D, and 6E are diagrams illustrating example temporary unlock request screens in an electronic device according to this disclosure.
Figure 6B:
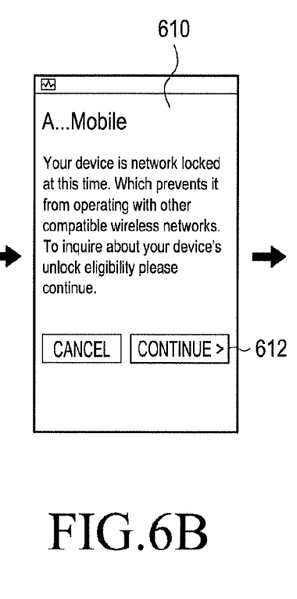
Figure 6C:
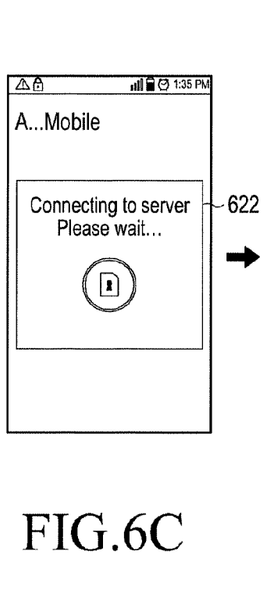
Figure 6D:
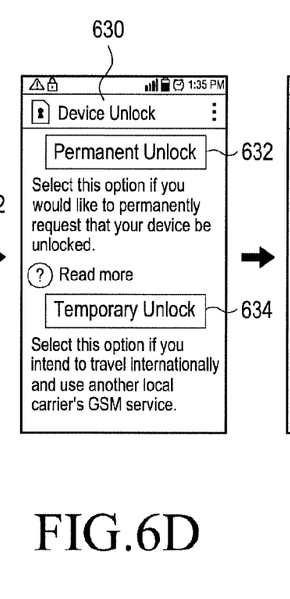
Figure 6E:
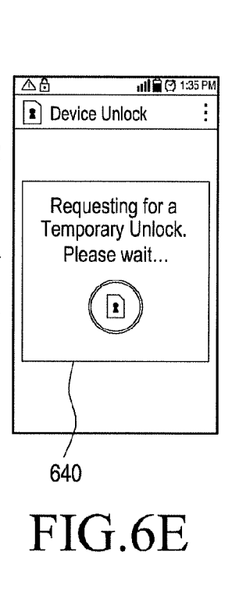

If the user input corresponds to the selected network temporary unlock application 601, and the electronic device 101, as shown in FIG. 6B, displays the network temporary unlock application screen 610. When a CONTINUE 612 in the network temporary unlock application screen 610 is selected by the user, the electronic device 101 requests a connection with the server 106, and displays a guidance message 622 indicating that is being connected with the server, as shown in FIG. 6C. When the electronic device 101 is connected with the server, the electronic device 101 displays options on a display screen 630 as shown in FIG. 6D. The options include a Permanent Unlock option 632 and a Temporary Unlock option 634. If a Temporary unlock option 634 is selected by the user, the electronic device 101 requests the network temporary unlock to the server 106, and as shown in FIG. 6E, displays a guidance message 640 indicating that the network temporary unlock request to the server is in progress.

Figure 7A:
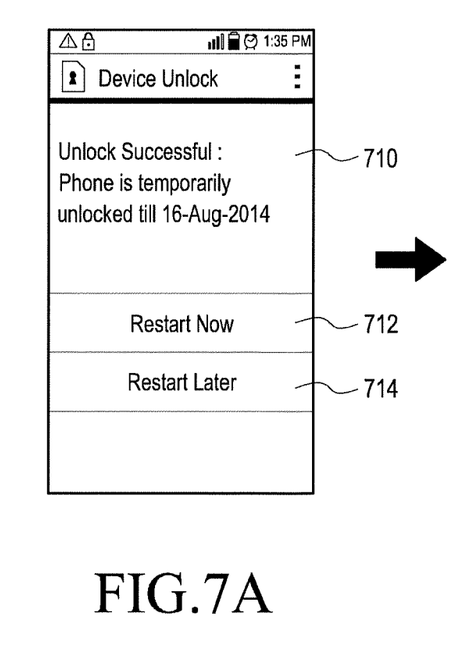
FIG. 7A is a diagram illustrating an example temporary unlock approval screen in an electronic device according to this disclosure.
Figure 7B:
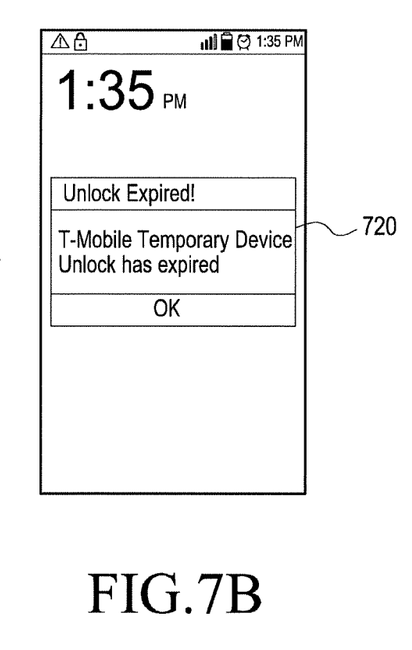
FIG. 7B is a diagram illustrating an example temporary unlock expiration screen in an electronic device according to this disclosure.

FIG. 7 is a diagram illustrating an example temporary unlock approval screen and an example temporary unlock expiration screen in an electronic device according to this disclosure. Referring to FIG. 7, the electronic device 101, when the network temporary unlock is approved by the server 106, and as shown in FIG. 7A, displays a screen 710 indicating that the network temporary unlock is approved. The screen 710 indicating that the network temporary unlock is approved, includes a network temporary unlock expiration time, 16 Aug. 2014, and displays a Restart Now option 712 and a Restart Later option 714. When a Restart Now option 712 is selected by the user, the electronic device 101 is rebooted and the network temporary lock state is set to be the network temporary unlock state. When a Restart Later option 714 is selected by the user, then the network temporary unlock state is set later. Meanwhile, when a network temporary unlock time has come after the set network temporary unlock state, the electronic device 101, as shown in FIG. 7B, displays a message 720 indicating that the network temporary unlock has expired.

Figure 8:
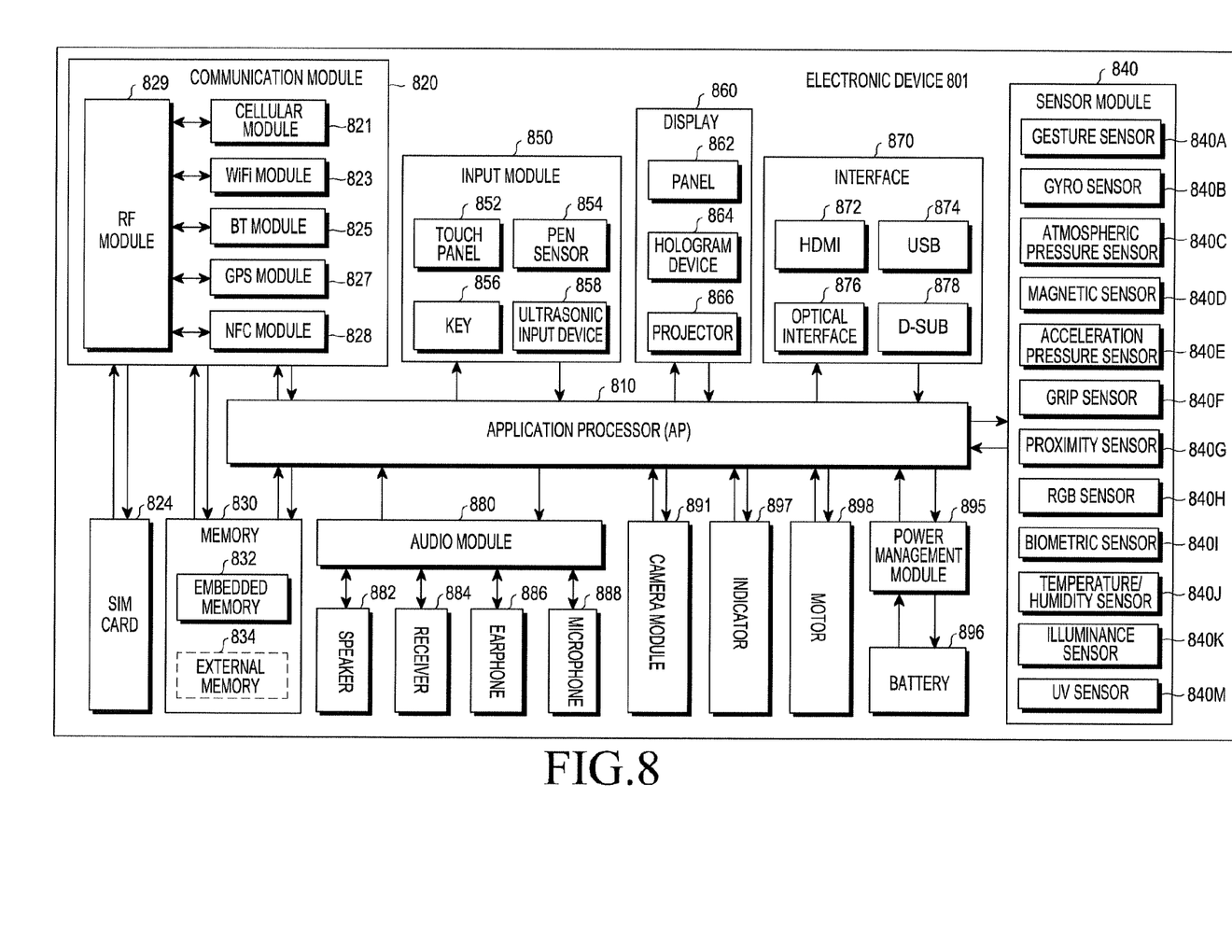
FIG. 8 is a block diagram of an example electronic device according to this disclosure.

FIG. 8 is a block diagram of an example electronic device according to this disclosure. Referring to FIG. 8, an electronic device 801 constitutes, for example, the entirety or a part of the electronic device 101 or 104 illustrated in FIG. 3. The electronic device 801 includes at least one Application Processor (AP) 810, a communication module 820, a Subscriber Identifier Module (SIM) card 824, a memory 830, a sensor module 840, an input device 850, a display 860, an interface 870, an audio module 880, a camera module 891, a power management module 895, a battery 896, an indicator 897, and a motor 898.

The AP 810 controls a plurality of hardware or software elements connected to the AP 810 by driving an operating system or an application program and process various types of data including multimedia data and perform calculations. The AP 810 may, for example, be implemented as a system on chip (SoC). According to an embodiment, the AP 810 further includes a Graphic Processing Unit (GPU).

The communication module 820 (such as, the communication interface 160) transmits and/or receives data in communication between the electronic device 801 (such as, the electronic device 101) and other electronic devices (such as, the electronic device 104 or the server 106) connected through a network. According to one embodiment, the communication module 820 includes a cellular module 821, a Wi-Fi module 823, a BT module 825, a GPS module 827, an NFC module 828, and a Radio Frequency (RF) module 829.

The cellular module 821 provides a voice call, a video call, a message service, or an Internet service through a communication network (such as, LTE, LTE-A, CDMA, WCDMA, UMTS, WiBro, or GSM). In addition, the cellular module 821 identifies and authenticates the electronic device in a communication network using, for example, a subscriber identification module (such as, the SIM card 824). According to an embodiment, the cellular module 821 performs at least some functions which the AP 810 provides. For example, the cellular module 821 performs at least a portion of a multimedia control function.

According to an embodiment, the cellular module 821 includes a Communication Processor (CP). In addition, the cellular module 821 is implemented by, for example, an SoC. Although the elements, such as the cellular module 821 (such as, the communication processor), the memory 830, and the power management module 895, are illustrated as separate components from the AP 810 in FIG. 8, the AP 810 is implemented to include at least some (such as, the cellular module 821) of the aforementioned elements according to one embodiment.

According to one embodiment, the AP 810 or the cellular module 821 (such as, the communication processor) loads, in a volatile memory, instructions or data received from at least one of a non-volatile memory and other elements connected thereto and process the loaded instructions or data. In addition, the AP 810 or the cellular module 821 stores, in a non-volatile memory, data received from or created by at least one of other elements.

Each of the Wi-Fi module 823, the BT module 825, the GPS module 827, and the NFC module 828 includes, for example, a processor for processing data transmitted/received through the corresponding module. Although the cellular module 821, the WiFi module 823, the BT module 825, the GPS module 827, and the NFC module 828 are illustrated as separate blocks in FIG. 8, at least some (such as, two or more) of them is contained in one Integrated Chip (IC) or one IC package according to one embodiment. For example, at least some of the processors corresponding to the cellular module 821, the WiFi module 823, the BT module 825, the GPS module 827, and the NFC module 828 (such as, the communication processor corresponding to the cellular module 821 and the WiFi processor corresponding to the WiFi module 823) is implemented by one SoC.

The RF module 829 transmits and/or receives data such as an RF signal. The RF module 829 includes, for example, a transceiver, a Power Amp Module (PAM), a frequency filter, a Low Noise Amplifier (LNA), or the like. In addition, the RF module 829 further includes a component, such as a conductor or a conductive wire, for transmitting/receiving an electromagnetic wave in a free space in wireless communication. Although the cellular module 821, the Wi-Fi module 823, the BT module 825, the GPS module 827, and the NFC module 828 share one RF module 829 in FIG. 8, at least one of them transmits and/or receives an RF signal through a separate RF module according to one embodiment.

According to one embodiment, the electronic device 801 is connected to a companion device (such as, the electronic device 104) through the Wi-Fi module 823, the BT module 825, or the NFC module 828. In addition, the electronic device 801 accesses a base station (such as, the server 106) through the cellular module 821 and is connected to a host device (such as, the electronic device 101) through the base station.

The SIM card 824 is a card including a subscriber identification module, and is inserted into a slot formed in a particular portion of the electronic device. The SIM card 824 includes unique identification information (such as, Integrated Circuit Card IDentifier (ICCID)) or subscriber information (such as, International Mobile Subscriber Identity (IMSI)).

The memory 830 (such as, the memory 130) includes an internal memory 832 or an external memory 834. The internal memory 832 includes at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 832 is a Solid State Drive (SSD). The external memory 834 further includes a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 834 is functionally connected with the electronic device 801 through various interfaces. According to an embodiment, the electronic device 801 further includes a storage device (or a storage medium) such as a hard disc drive.

The sensor module 840 measures a physical quantity or detects an operation state of the electronic device 801, and converts the measured or detected information to an electrical signal. The sensor module 840 includes, for example, at least one of a gesture sensor 840A, a gyro sensor 840B, an atmospheric pressure sensor 840C, a magnetic sensor 840D, an acceleration sensor 840E, a grip sensor 840F, a proximity sensor 840G, a color sensor 840H (such as, Red, Green, and Blue (RGB) sensor), a biometric sensor 840I, a temperature/humidity sensor 840J, an illumination sensor 840K, and a Ultra Violet (UV) sensor 840M. Additionally or alternatively, the sensor module 840 includes, for example, an E-nose sensor, an electromyography (EMG) sensor, an electroencephalogram (EEG) sensor, an electrocardiogram (ECG) sensor, an Infrared (IR) sensor, an iris sensor, and a fingerprint sensor. In addition, the sensor module 840 includes a Heart Rate Variability (HRV) sensor or a Heart Rate Monitor (HRM) sensor. The sensor module 840 further includes a control circuit for controlling one or more sensors included in the sensor module 240.

The input device 850 includes a touch panel 852, a (digital) pen sensor 854, a key 856, and an ultrasonic input device 858. The touch panel 852 recognizes a touch input through at least one of, for example, a capacitive type, a resistive type, an infrared type, and an ultrasonic type. The touch panel 852 further includes a control circuit. The capacitive type touch panel recognizes physical contact or proximity. The touch panel 852 further includes a tactile layer. In this case, the touch panel 852 provides a tactile reaction to the user.

The (digital) pen sensor 854 is implemented, for example, using the same or similar method to receiving a user's touch input or using a separate recognition sheet. The key 856 includes, for example, a physical button, an optical key, or a keypad. The ultrasonic input device 858 detects an acoustic wave using a microphone (such as, a microphone 888) and identifies data in the electronic device 801 through an input tool for generating an ultrasonic signal and performs wireless recognition. According to one embodiment, the electronic device 801 also receives a user input from an external device (such as, a computer or a server) connected thereto, using the communication module 820.

The display 860 (such as, the display 150) includes a panel 862, a hologram device 864, and a projector 866. The panel 862 is, for example, a Liquid Crystal Display (LCD), Active-Matrix Organic Light Emitting Diode (AM-OLED), or the like. The panel 862 is implemented to be, for example, flexible, transparent, or wearable. The panel 862 is configured as one module together with the touch panel 852. The hologram device 864 shows a stereoscopic image in the air by using interference of light. The projector 866 projects light onto a screen to display an image. The screen is located, for example, inside or outside the electronic device 801. According to an embodiment, the display 860 further includes a control circuit for controlling the panel 862, the hologram device 864, or the projector 866.

The interface 870 includes, for example, a High-Definition Multimedia Interface (HDMI) 872, a Universal Serial Bus (USB) 874, an optical interface 876, or a D-subminiature (D-sub) 878. The interface 870 is included in, for example, the communication interface 160 illustrated in FIG. 3. Additionally or alternatively, the interface 870 includes, for example, a Mobile High-definition Link (MHL) interface, a Secure Digital (SD) card/Multi-Media Card (MMC) interface, or an Infrared Data Association (IrDA) standard interface.

The audio module 880 bilaterally converts a sound and an electrical signal. At least some components of the audio module 880 are included in, for example, the input/output interface 140 illustrated in FIG. 3. The audio module 880 processes sound information input or output through, for example, the speaker 882, the receiver 884, the earphones 886, the microphone 888 or the like.

The camera module 891 captures still images and moving images. According to one embodiment, the camera module 891 includes one or more image sensors (such as, a front sensor and a rear sensor), a lens, an Image Signal Processor (ISP) or a flash (such as, an LED or a xenon lamp).

The power management module 895 manages power of the electronic device 801. The power management module 895 includes, for example, a Power Management Integrated Circuit (PMIC), a charger Integrated Circuit (IC), or a battery or fuel gauge.

The PMIC is mounted to, for example, an integrated circuit or an SoC semiconductor. Charging methods are classified into a wired charging method and a wireless charging method. The charger IC charges a battery and prevents over voltage or over current from a charger. According to an embodiment, the charger IC includes a charger IC for at least one of the wired charging method and the wireless charging method. Examples of the wireless charging method includes a magnetic resonance type, a magnetic induction type, or an electromagnetic wave type, and an additional circuit for wireless charging, such as a coil loop circuit, a resonance circuit, or a rectifier circuit is added.

The battery gauge measures, for example, a remaining quantity of the battery 896, or a voltage, a current, or a temperature during the charging. The battery 896 stores or generates electricity, and supplies power to the electronic device 801 using the stored or generated electricity. The battery 896 includes, for example, a rechargeable battery or a solar battery.

The indicator 897 displays a particular status of the electronic device 801 or a part thereof (such as, the AP 810), for example, a booting status, a message status, or a charging status. The motor 898 converts an electrical signal to a mechanical vibration. The electronic device 801 includes a processing unit (such as, a GPU) for supporting a mobile TV function. The processing unit for supporting the mobile TV processes media data according to a standard of Digital Multimedia Broadcasting (DMB), Digital Video Broadcasting (DVB), media flow or the like.

The above described components of the electronic device according to various embodiments of the present disclosure are formed of one or more components, and a name of a corresponding component element is changed based on the type of electronic device. The electronic device according to the present disclosure includes one or more of the aforementioned components or further includes other additional components, or some of the aforementioned components may be omitted. Further, some of the components of the electronic device according to the various embodiments of the present disclosure are combined to form a single entity, and thus, equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The module may be a minimum unit of an integrated component element or a part thereof. The "module" may be the smallest unit that performs one or more functions or a part thereof. The module may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least a part of a device (for example, modules or functions thereof) or a method (for example, operations) according to the various embodiments of the present disclosure may be embodied by, for example, a command stored in a computer readable storage medium in a form of a programming module. When the command is executed by one or more processors (such as the processor 120 in FIG. 3), the one or more processors may perform a function corresponding to the command. The computer-readable storage medium may be, for example, the memory 130 in FIG. 3. At least a part of the programming module may be implemented (such as, executed) by, for example, the processor 120 in FIG. 3. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

A module or a programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium storing instructions (or program) for executing an operation in an electronic device is provided. The instructions include transmitting a network temporary unlock request and receiving a network temporary unlock approval. The instructions also include performing a network temporary unlock when the network temporary unlock approval is received. The instructions further include determining whether a network temporary unlock expiration time has come. The instructions include releasing the network temporary unlock when the network temporary unlock time has expired.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a communication interface configured to transmit a network temporary unlock request to a server and receive a network temporary unlock approval corresponding to the network temporary unlock request from the server; and
a processor configured to perform a network temporary unlock in response to the network temporary unlock approval until an unlock expiration time,
wherein the processor determines whether the unlock expiration time has come using time information and releases the network temporary unlock when an unlock time has expired,
wherein, by using the network temporary unlock approval, the electronic device accesses a network which is different from a network permitted by a network lock.

2. The device of claim 1, wherein the communication interface is configured to receive an external signal; and
the processor is configured to obtain time information by using the external signal, and determine whether the unlock expiration time has come by using the obtained external signal.

3. The device of claim 2, wherein the communication interface comprises a cellular module; and wherein the external signal is a Network Identity and Time Zone (NITZ) signal received from a base station via the cellular module.

4. The device of claim 2, wherein the communication interface comprises a GPS module; and wherein the external signal is a GPS signal received from three or more satellites via the GPS module.

5. The device of claim 2, wherein the processor is configured to create a timer that discounts time remaining up to the unlock expiration time, and determine whether the unlock expiration time has come by discounting using the timer.

6. The device of claim 5, further comprising a memory having a secure area; and wherein the processor is configured to store a value discounted by the timer in the secure area.

7. The electronic device of claim 1, wherein the electronic device comprises at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device.

8. A method for using a network temporary unlock in an electronic device, the method comprising:
transmitting a network temporary unlock request to a server and receiving a network temporary unlock approval corresponding to the network temporary unlock request from the server;
performing a network temporary unlock in response to the network temporary unlock approval until an unlock expiration time;
determining whether the unlock expiration time has come using time information; and
releasing the network temporary unlock when an unlock time has expired,
wherein, by using the network temporary unlock approval, the electronic device accesses a network which is different from a network permitted by a network lock.

9. The method of claim 8, wherein determining whether the unlock expiration time has come comprises:
receiving an external signal;
acquiring time information using the external signal; and
determining whether the unlock expiration time has come by using the obtained time information.

10. The method of claim 9, wherein the receiving of the external signal is receiving a Network Identity and Time Zone (NITZ) signal from a base station.

11. The method of claim 9, wherein receiving the external signal comprises receiving GPS signals from three or more satellites via a GPS module.

12. The method of claim 9, further comprising:
creating a timer that discounts time remaining up to the unlock expiration time, and
determining whether the unlock expiration time has come by discounting using the timer.

13. The method of claim 12, further comprising storing a value discounted by the timer in a secure area of a memory.

14. The method of claim 7, wherein the electronic device comprises at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, or a wearable device.

15. A non-transitory storage medium configured to store a network temporary unlock program, that when executed by one or more processors in an electronic device, cause the one or more processors to:
control a transmission of a network temporary unlock request to a server and a reception of a network temporary unlock approval corresponding to the network temporary unlock request from the server;
perform the network temporary unlock in response to the approval of the network temporary unlock until an unlock expiration time;
determine whether the unlock expiration time has come using time information; and release the network temporary unlock when an unlock time has expired, wherein, by using the network temporary unlock approval, the electronic device accesses a network which is different from a network permitted by a network lock.

16. The non-transitory storage medium of claim 13, wherein when the network temporary unlock program is executed by the one or more processors, the network temporary unlock program causes the one or more processors to:
control a reception of an external signal,
obtain time information by using the external signal, and
determine whether the unlock expiration time has come by using the obtained external signal.

17. The non-transitory storage medium of claim 16, wherein the external signal is a Network Identity and Time Zone (NITZ) signal received from a base station via a cellular module.

18. The non-transitory storage medium of claim 16, wherein the external signal is a GPS signal received from three or more satellites via a GPS module.

19. The non-transitory storage medium of claim 16, wherein when the network temporary unlock program is executed by the one or more processors, the network temporary unlock program causes the one or more processors to:
create a timer that discounts time remaining up to the unlock expiration time, and determine whether the unlock expiration time has come by discounting using the timer.

20. The non-transitory storage medium of claim 19, wherein the one or more processors are configured to store a value discounted by the timer in a secure area of a memory.

* * * * *